US012791761B2

(12) United States Patent
Amemiya

(10) Patent No.: US 12,791,761 B2
(45) Date of Patent: Nov. 10, 2026

(54) LIGHT ABSORBER AND METHOD FOR MANUFACTURING SAME

(71) Applicant: National Institute of Advanced Industrial Science and Technology, Tokyo (JP)

(72) Inventor: Kuniaki Amemiya, Tsukuba (JP)

(73) Assignee: NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 865 days.

(21) Appl. No.: 18/024,346

(22) PCT Filed: Aug. 19, 2021

(86) PCT No.: PCT/JP2021/030293
§ 371 (c)(1),
(2) Date: Mar. 2, 2023

(87) PCT Pub. No.: WO2022/050061
PCT Pub. Date: Mar. 10, 2022

(65) Prior Publication Data

US 2023/0296808 A1 Sep. 21, 2023

(30) Foreign Application Priority Data

Sep. 4, 2020 (JP) ................................ 2020-149055

(51) Int. Cl.
*G02B 1/04* (2006.01)
*G02B 1/111* (2015.01)

(52) U.S. Cl.
CPC ................ *G02B 1/111* (2013.01); *G02B 1/04* (2013.01)

(58) Field of Classification Search
CPC .......... G02B 1/111; G02B 1/04; G02B 5/003; G02B 1/118; G02B 5/00; B23B 7/023
See application file for complete search history.

(56) References Cited

U.S. PATENT DOCUMENTS

2006/0139749 A1* 6/2006 Watanabe ............ G02B 17/006 359/613
2016/0091632 A1* 3/2016 Shimatsu ................. G02B 1/14 359/581
(Continued)

FOREIGN PATENT DOCUMENTS

EP 3699649 A1 8/2020
JP 2005-072662 A 3/2005
(Continued)

OTHER PUBLICATIONS

Examiner provided machine translation of Amemiya, WO 2019087439 A1 (Year: 2019).*
(Continued)

*Primary Examiner* — Balram T Parbadia
(74) *Attorney, Agent, or Firm* — Troutman Pepper Locke LLP; James E. Armstrong, IV

(57) ABSTRACT

This light absorber 10 comprises a light absorbing layer 11 made of a resin which contains a light absorbing material. The light absorber is obtained by forming an optical confinement structure 12 in which a plurality of fine protrusions are formed on a surface 11*a* of the light absorber. The light absorber is configured such that luminous reflectance $R_{SCI}$ according to the Specular Components Included (SCI) method, which detects a total of specular reflected light and diffuse reflected light, does not exceed 0.20%.

19 Claims, 7 Drawing Sheets

(56) References Cited

U.S. PATENT DOCUMENTS

| | | | | |
|---|---|---|---|---|
| 2019/0219739 | A1* | 7/2019 | Gregorski | C03C 17/3435 |
| 2019/0330450 | A1 | 10/2019 | Toyama et al. | |
| 2020/0183052 | A1* | 6/2020 | Szambolics | G02B 1/11 |
| 2020/0346421 | A1 | 11/2020 | Amemiya | |
| 2020/0363570 | A1* | 11/2020 | Suwa | G02B 5/0278 |

FOREIGN PATENT DOCUMENTS

| | | | | |
|---|---|---|---|---|
| JP | 2011-154179 | A | | 8/2011 |
| JP | 2013-018910 | A | | 1/2013 |
| JP | 2015-114464 | A | | 6/2015 |
| JP | 2016033659 | A | * | 3/2016 |
| JP | 2017-016037 | A | | 1/2017 |
| JP | 2018-532671 | A | | 11/2018 |
| WO | 2013/009684 | A1 | | 1/2013 |
| WO | 2017/033031 | A1 | | 3/2017 |
| WO | 2017/217504 | A1 | | 12/2017 |
| WO | 2019/087439 | A1 | | 5/2019 |
| WO | 2020/051536 | A1 | | 3/2020 |

OTHER PUBLICATIONS

H. Ye et al., "Infrared absorption coefficients of vertically aligned carbon nanotube films", Applied Physics Letters, vol. 101, Oct. 1, 2012, pp. 141909-1 to 141909-4. (cited in the Feb. 12, 2024 Search Report issued for EP21864119.9).

Extended European Search Report issued in the EP Patent Application No. 21864119.9, mailed on Feb. 12, 2024.

Amemiya, K., et al.,"Perfect blackbody sheets from nano-precision microtextured elastomers for light and thermal radiation management", Journal of Materials Chemistry C, 2019, No. 7, pp. 5418-5425 and a cover sheet; Apr. 23, 2019. (discussed in the spec).

Amemiya, K., et al., "Fabrication of hard-coated optical absorbers with microstructured surfaces using etched ion tracks: Toward broadband ultra-low reflectance" Nuclear Instruments and Methods in Physics Research B, 2015 , pp. 154-159; May 14, 2015. (cited in the ISR).

* cited by examiner

FIG. 10

| | LUMINOUS REFLECTANCE ACCORDING TO SCI METHOD $R_{SCI}$(%) | MIRROR FINISH | | |
|---|---|---|---|---|
| | | $R_{SCE}$(%) | $R_{SCI}$(%) | $R_{SCE}$/$R_{SCI}$ |
| Example 1 | 0. 02 | 0. 03 | 4. 02 | 0. 0075 |
| Example 2 | 0. 02 | 0. 01 | 4. 86 | 0. 0021 |
| Example 3 | 0. 02 | 0. 00 | 4. 92 | 0. 0000 |
| Example 4 | 0. 07 | 0. 01 | 3. 98 | 0. 0025 |
| Example 5 | 0. 05 | 0. 01 | 3. 98 | 0. 0025 |
| Example 6 | 0. 07 | 0. 04 | 4. 09 | 0. 0098 |
| Example 7 | 0. 06 | 0. 01 | 4. 06 | 0. 0025 |
| Example 8 | 0. 08 | 0. 04 | 4. 08 | 0. 0098 |
| Example 9 | 0. 12 | 0. 09 | 3. 98 | 0. 023 |
| Example 10 | 0. 17 | 0. 17 | 3. 93 | 0. 043 |
| Example 11 | 0. 06 | 0. 02 | 4. 89 | 0. 0041 |
| Example 12 | 0. 11 | 0. 07 | 4. 09 | 0. 017 |
| Example 13 | 0. 17 | 0. 13 | 4. 20 | 0. 031 |

FIG. 11

| | LUMINOUS REFLECTANCE ACCORDING TO SCI METHOD $R_{SCI}$(%) |
|---|---|
| Comparative Example 1 | 4. 90 |
| Comparative Example 2 | 0. 06 |
| Comparative Example 3 | 0. 86 |
| Comparative Example 4 | 1. 36 |
| Comparative Example 5 | 2. 47 |
| Comparative Example 6 | 0. 56 |
| Comparative Example 7 | 1. 22 |
| Comparative Example 8 | 0. 28 |

FIG. 12

| | MAXIMUM REFLECTANCE ACCORDING TO SCI METHOD IN NEAR INFRARED(%) |
|---|---|
| Example 2 | 0. 14 |
| Example 3 | 0. 24 |
| Example 5 | 0. 15 |
| Example 6 | 0. 16 |
| Example 7 | 0. 18 |
| Example 12 | 0. 12 |
| Example 13 | 0. 20 |

LIGHT ABSORBER AND METHOD FOR MANUFACTURING SAME

TECHNICAL FIELD

The present invention relates to a light absorber and a method for manufacturing the same, and more particularly to a light absorber having a low reflectance and a method for manufacturing the same.

BACKGROUND ART

A Material absorbing 99.8% or more of visible light, such as a structure with aligned carbon nanotubes on a surface of the structure, has been developed. Further, a carbon nanotube structure is known in which a hydrophobic coating is formed on the surface of the aligned carbon nanotubes (for example, see Patent Document 1). However, the aligned carbon nanotubes are easily destroyed by physical contact and have a low contact resistance, and hence could not withstand use in a general environment.

As a light absorber having a comparatively high contact resistance, a light absorber made of a resin such as polydimethylsiloxane (PDMS) containing carbon nanotubes or carbon black is known.

(See, for example, Patent Document 2 or 3.)

The present inventor has developed a light absorber having a low reflectance and have made disclosures and the like (see Patent Document 4 and Non-Patent Document 1).

Patent Document 1: PCT International Publication No. WO2017/33031

Patent Document 2: Japanese Unexamined Patent Application, Publication No. 2017-16037

Patent Document 3: PCT International Publication No. WO2017/217504

Patent Document 4: PCT International Publication No. WO2019/087439

Non-Patent Document 1: K. Amemiya et al., J. Mater. Chem. C, 2019, 7, pp 5418-5425

DISCLOSURE OF THE INVENTION

Problems to be Solved by the Invention

A light absorber having a comparatively high contact resistance has a light absorptance that is only about 99.6% and has a reflectance that is more than two times to four times that of a structure with aligned carbon nanotubes. Human eyes perceive brightness of an object by detecting an amount of reflected light. According to Weber-Fechner law, a discrimination threshold of stimulus is proportional to an intensity of reference stimulus, and hence even an object having a light reflectance of 0.4%, 0.2%, 0.1% or less can be sufficiently discerned with the human eyes. For this reason, even in a general environment, when unnecessary light diffuse reflection, glare, background reflection or the like is to be suppressed, a light absorptance of 99.8%, or even a light absorptance of 99.9% or more has become required.

It is an object of the present invention to provide a light absorber having a high contact resistance and an extremely low luminous reflectance and a method for manufacturing the same.

Means for Solving the Problems

According to one aspect of the present invention, there is provided a light absorber including a light absorbing layer made of a resin which contains a light absorbing material and an optical confinement structure including a plurality of fine protrusions formed on a surface of the light absorber, in which the light absorber is configured such that luminous reflectance $R_{SCI}$ according to a specular components included (SCI) method, which detects a total of specular reflected light and diffuse reflected light, does not exceed 0.20%.

According to the above aspect, the light absorber has the optical confinement structure including the plurality of fine protrusions formed on the surface of the light absorbing layer made of the resin which contains the light absorbing material, so that outward reflection of light incident on the optical confinement structure from outside is suppressed, to propagate light to the light absorbing layer, and outward scattering is extremely suppressed by the light absorbing material contained in the light absorbing layer. As a result, a light reflectance is extremely low, and the luminous reflectance $R_{SCI}$ according to the SCI method, which detects the total of the specular reflected light and the diffuse reflected light, does not exceed 0.20%. Along with this, the light absorber has the surface made of the resin to obtain a high contact resistance and can be used as an extremely low light reflective material on general use conditions.

According to another aspect of the present invention, there is provided a light absorber including another light absorbing layer containing a light absorbing material, and a surface layer provided on the other light absorbing layer, made of a resin and including an optical confinement structure including a plurality of fine protrusions formed on a surface thereof, in which the light absorber is configured such that luminous reflectance $R_{SCI}$ according to a specular components included (SCI) method, which detects a total of specular reflected light and diffuse reflected light, does not exceed 0.20%.

According to the above other aspect, the light absorber includes the surface layer provided on the light absorbing layer containing the light absorbing material and including the optical confinement structure including the plurality of fine protrusions formed on a surface thereof, so that the surface layer suppresses outward reflection of the light incident on the optical confinement structure from outside, to propagate light to the light absorbing layer, and outward scattering of light is extremely suppressed by the light absorbing material contained in the light absorbing layer. As a result, the light reflectance can be extremely low, and the luminous reflectance $R_{SCI}$ according to the SCI method, which detects the total of the specular reflected light and the diffuse reflected light, does not exceed 0.20%. Along with this, the light absorber has the surface layer made of the resin, to obtain a high contact resistance, and can be used as the extremely low light reflective material on the general use conditions.

According to a further aspect of the present invention, there is provided a light absorber having a resin layer containing a light absorbing material and having an optical confinement structure including a plurality of fine protrusions formed on a surface of the resin layer, in which the light absorbing material includes a material selected from the group consisting of black lacquer, an inorganic black pigment, aligned carbon nanotubes and a black dye.

According to a further aspect of the present invention, there is provided a light absorber including a first layer containing a resin and a light absorbing material selected from the group consisting of black lacquer, an inorganic black pigment, aligned carbon nanotubes and a black dye, or containing a light absorbing material selected from the group consisting of a porous inorganic black film, an electrostatic flocking black cloth and a foamed polyurethane black sheet, and a second layer provided on the first layer, made of a resin and including an optical confinement structure including a plurality of fine protrusions formed on a surface thereof.

According to a further aspect of the present invention, there is provided a method for manufacturing a light absorber, including a step of forming a precursor of a light absorbing layer with a light absorbing material and a resin liquid, and a step of pressing, onto a surface of the precursor, a mold having a surface on which a plurality of fine protrusions are formed, before the resin liquid cures, and curing the resin liquid to form a light absorbing layer having a surface including an optical confinement structure, wherein the light absorbing material includes a material selected from the group consisting of black lacquer, an inorganic black pigment, aligned carbon nanotubes and a black dye.

According to a still further aspect of the present invention, there is provided a method for manufacturing a light absorber, including a step of forming a light absorbing layer containing a resin and a light absorbing material selected from the group consisting of black lacquer, an inorganic black pigment, aligned carbon nanotubes and a black dye, or containing a light absorbing material selected from the group consisting of a porous inorganic black film, an electrostatic flocking black cloth and a foamed polyurethane black sheet, a step of applying a resin liquid onto a surface of the light absorbing layer, and a step of pressing a mold having a surface on which a plurality of fine protrusions are formed, before the resin liquid cures, and curing the resin liquid to form a surface layer having a surface including an optical confinement structure.

BRIEF DESCRIPTION OF THE DRAWINGS

FIG. 10 is a diagram showing luminous reflectance of examples;

FIG. 11 is a diagram showing luminous reflectance of a comparative example; and FIG. 12 is a diagram showing reflectance of the examples in near infrared according to an SCI method.

PREFERRED MODE FOR CARRYING OUT THE INVENTION

Figure 1:
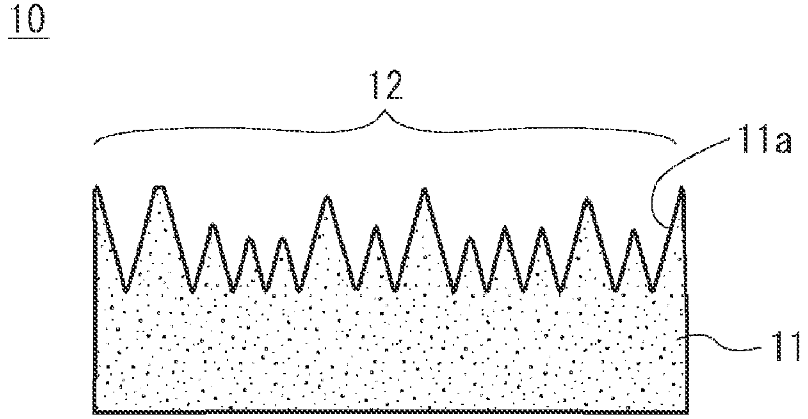
FIG. 1 is a schematic diagram showing a structure of a light absorber according to a first embodiment.

Hereinafter, an embodiment of the present invention will be described based on the drawings. It should be noted that a common element among a plurality of drawings is denoted with the same reference numeral, and detailed description of the element is not repeated.

First Embodiment

FIG. 1 is a schematic diagram showing a structure of a light absorber according to a first embodiment. Referring to FIG. 1, a light absorber 10 according to the first embodiment has a light absorbing layer 11, and on a surface 11*a* of the layer, an optical confinement structure 12 is formed. The light absorbing layer 11 is a resin layer containing a light absorbing material. The light absorbing material is a material selected from the group consisting of black lacquer, an inorganic black pigment, aligned carbon nanotubes and a black dye. When the light absorbing material is a black dye, carbon black may be further contained.

The black lacquer is black natural or synthetic lacquer. The light absorbing layer 11 that is a black lacquer coating film containing black lacquer is a coating film obtained by dry-curing black refined lacquer paint in air or a coating film obtained by dry-curing black cashew paint (for example, manufactured by Cashew Co., Ltd.) in air. In the light absorber 10, the optical confinement structure 12 is formed on the surface of this coating film before the coating film cures.

The inorganic black pigment includes fine particles of a metal, a metal oxide or a composite thereof, and includes, for example, fine particles of aluminum, aluminum oxide, platinum, gold, silver and a mixture thereof. The inorganic black pigment is, for example, a component of Metal Velvet from Acktar Ltd. The light absorber 10 is obtained by mixing and kneading the inorganic black pigment with a resin to form the light absorbing layer 11 and forming the optical confinement structure 12 on the surface of the layer before the resin cures.

Aligned carbon nanotubes form a material having a layer composed of a large number of carbon nanotubes aligned perpendicularly to a substrate. The aligned carbon nanotubes form, for example, a material described in PCT International Publication No. WO2017/033031. The light absorber 10 is obtained by embedding the aligned carbon nanotubes with a resin to form the light absorbing layer 11 as an aligned carbon nanotube embedded resin layer and forming the optical confinement structure 12 on the surface of the light absorbing layer before the resin cures.

As a black dye, for example, aniline black, nigrosine or sudan black can be used, and an oil-based color or oil-based paint containing aniline black can be used. The light absorber 10 is obtained by mixing, kneading and applying the black dye and resin or applying and curing the color or paint to form the light absorbing layer 11 that is a black dye-containing resin layer and forming the optical confinement structure 12 on the surface of the light absorbing layer before the resin cures.

In the light absorbing layer 11, at least one resin selected from the group consisting of epoxy resin, polyester resin, acrylic resin, polycarbonate resin and vinyl chloride resin can be used. Since the light absorbing layer 11 is formed by curing such a resin, the optical confinement structure formed on the surface can improve a contact resistance. Even if the optical confinement structure is touched by hands, the structure is hard to deteriorate, and increase in light reflectance is suppressed. The light absorbing layer 11 may include an ultraviolet curable resin, which is preferable because a curing time can be shortened.

The optical confinement structure 12 is composed of a large number of fine protrusions formed on the surface 11$a$ of the light absorbing layer 11. The optical confinement structure 12 takes light incident from outside into a protrusion base and further into the light absorbing layer 11. The optical confinement structure 12 specifically has a plurality of protrusions formed to protrude outward from the surface. Protrusion tips are connected like ridges or have a conical shape. Each protrusion has a cross-sectional shape gradually expanding from the tip toward the base. When the tips have a connected ridge-like shape, a distance between adjacent ridges is preferably from 0.1 μm to 100 μm. When the tip has the conical shape, a distance between adjacent tips is preferably from 0.1 μm to 100 μm.

Figure 2:
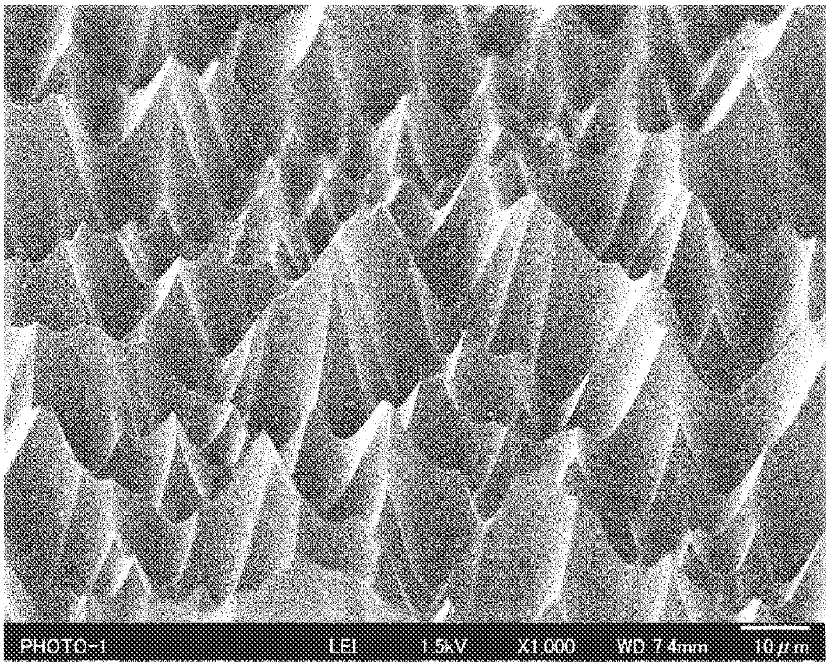
FIG. 2 is an electron micrograph of a surface of an example of the light absorber according to the first embodiment.

FIG. 2 is an electron micrograph of a surface of an example of the light absorber according to the first embodiment, showing an example of the optical confinement structure. Referring to FIG. 2 together with FIG. 1, in the optical confinement structure 12, a plurality of protrusions are connected like ridges on the surface 11$a$ of the light absorbing layer 11, and a large number of protrusions gradually expanding toward the base are formed. It is seen that the adjacent ridges are formed apart by 1 μm to several tens of micrometers. The light incident on the optical confinement structure 12 propagates toward the base of each protrusion, and is absorbed by the light absorbing material of the light absorbing layer 11 wherein scattering is suppressed. In the light absorbing layer 11, since scattering is suppressed, light propagating outward from the surface 11$a$ of the light absorber 11 is suppressed. In this way, the light absorber 10 exhibits an extremely low reflectance, and can, in particular, extremely reduce luminous reflectance that is a reflectance value weighted and averaged by human eye sensitivity (spectral luminous efficacy). In addition, an optical confinement structure of a light absorber according to a second embodiment described later is the same as in FIG. 2.

As described above, the light absorbing layer 11 of the light absorber 10 is a resin composite material containing a light absorbing material having extremely low light scattering properties. The low light scattering properties of the light absorbing layer 11 can be characterized by mirror finishing the optical confinement structure 12 in the surface 11$a$ of the light absorbing layer 11. The light absorbing layer 11 is preferably configured such that luminous reflectance $R_{SCE}$ according to a specular components excluded (SCE) method, which detects diffuse reflected light, does not exceed 0.20% after the surface 11$a$ on which the optical confinement structure 12 is formed is mirror finished.

In the light absorber 10, when the surface of the light absorbing layer 11 is treated by the mirror finishing, a ratio $R_{SCE}/R_{SCI}$ of the luminous reflectance $R_{SCE}$ according to the SCE method to luminous reflectance $R_{SCI}$ according to a specular components included (SCI) method of detecting a total of specular reflected light and diffuse reflected light does not exceed 0.05. That is, when the light absorber 10 is mirror finished, a proportion of the luminous reflectance $R_{SCE}$ obtained only by detecting diffuse reflected light excluding specular reflected light to the luminous reflectance $R_{SCI}$ obtained by detecting light including the specular reflected light does not exceed 5%.

An example of a mirror finishing method may include filling the surface on which the optical confinement structure 12 is formed with a transparent resin liquid to form a microscopically flat surface or flattening the optical confinement structure 12 by processing such as polishing or dissolving. Another example of the mirror finishing method may include flatly forming the surface on which the optical confinement structure is to be formed or applying a transparent resin liquid onto the surface to flatten the surface.

As will be apparent from examples, the light absorber 10 is configured such that 0.20% or less can be obtained as the luminous reflectance $R_{SCI}$ according to the SCI method, which detects the total of specular reflected light and diffuse reflected light. Furthermore, depending on the light absorbing material of the light absorbing layer 11, the light absorber is preferably configured such that 0.10% or less can be obtained as the luminous reflectance $R_{SCI}$ according to the SCI method. This can be obtained by the optical confinement structure 12, and the light absorbing layer 11 having extremely low light scattering properties.

To measure the luminous reflectance $R_{SCI}$ according to the SCI method and the luminous reflectance $R_{SCE}$ according to the SCE method, a spectrophotometer (manufactured by KONICA MINOLTA, INC., model CM-600d) according to an integrating sphere method is used, and according to geometric condition c in JIS Z 8722 (CIE 15:2004), under di: 8° in case of the SCI method (including specular reflected light), de: 8° in case of the SCE method (excluding specular reflected light), a field of view: 10°, a light source: D65, an integrating sphere: a diameter of 40 mm, a measurement wavelength range: from 400 nm to 700 nm, a measurement wavelength interval: 10 nm, a measurement diameter: 8 mm and an illumination diameter: 11 mm. The luminous reflectance corresponds to Y when reflective object color is represented by XYZ color system (CIE1931 (standard) color system).

Figure 3:
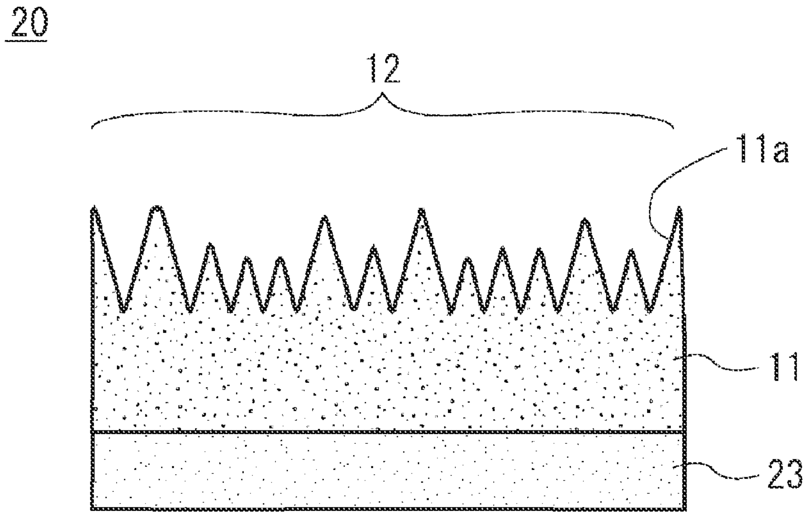
FIG. 3 is a schematic diagram showing a structure of a modification of the light absorber according to the first embodiment.

FIG. 3 is a schematic diagram showing a structure of a modification of the light absorber according to the first embodiment. Referring to FIG. 3, as the modification, a light absorber 20 includes an additional light absorbing underlayer 23 containing a light absorbing material under the light absorbing layer 11. The light absorber 20 has the light absorbing underlayer 23, and the light absorbing layer 11 thereon, and an optical confinement structure 12 is formed on a surface 11$a$ of the light absorbing layer 11. With this structure, even if there is light in a wavelength band transmitted through the light absorbing layer 11, the light is absorbed by the light absorbing material contained in the light absorbing underlayer 23, and the reflectance of the light absorber 20 is reduced.

The light absorbing material of the light absorbing underlayer 23 is not particularly limited, and it is preferable to use a light absorbing material different from that used in the light absorbing layer 11 among light absorbing materials for a light absorbing layer 11. The resin for the light absorbing underlayer 23 is not particularly limited, and the resin that is used in the light absorbing layer 11 can be used.

In the light absorber 20, for example, when the light absorbing material of the light absorbing layer 11 is black lacquer or a black dye, the light absorbing underlayer 23 is preferably a porous inorganic black film or a resin layer containing carbon black. The porous inorganic black film is made of a porous metal or metal oxide or a composite thereof, and, for example, Metal Velvet from Acktar Ltd.

Alternatively, a plurality of light absorbing underlayers 23 may be provided. The light absorbing underlayer 23 may be laminated by combining layers having characteristics of absorbing different wavelengths.

Figure 4:
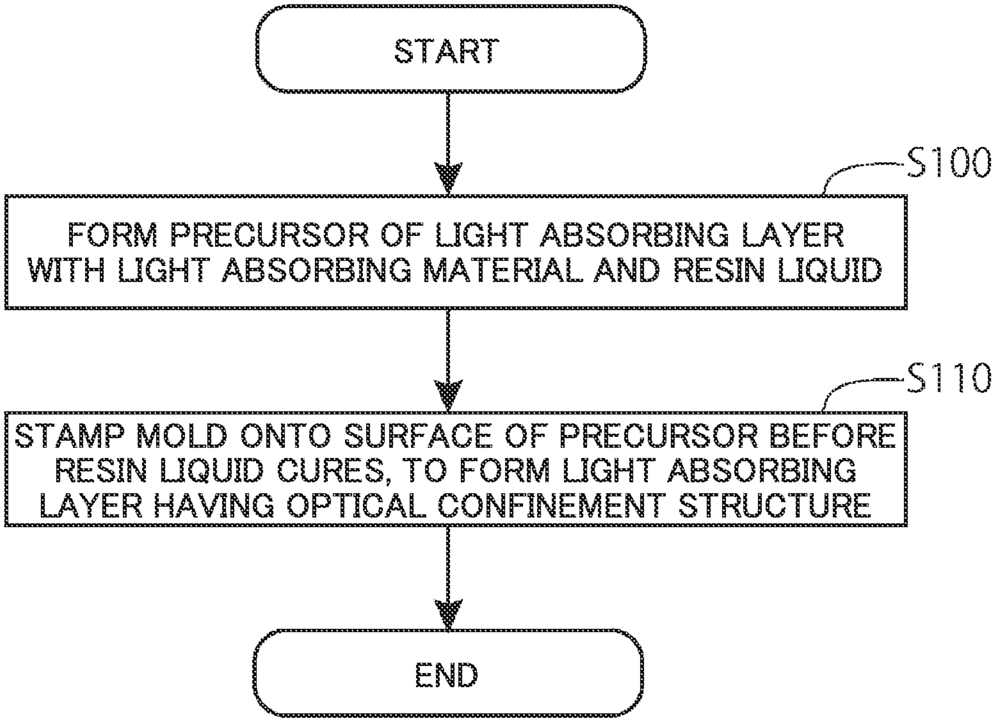
FIG. 4 is a flowchart showing a method for manufacturing the light absorber according to the first embodiment.

FIG. 4 is a flowchart showing a method for manufacturing the light absorber according to the first embodiment. Referring to FIG. 4, the method for manufacturing the light absorber of the present embodiment will be described.

Firstly, a precursor of the light absorbing layer is formed with the light absorbing material and the resin liquid (S100).

The resin liquid contains the light absorbing material and the resin and contains a solvent depending on the resin material. If the light absorbing material is black lacquer, black lacquer paint is applied. If the light absorbing material includes aligned carbon nanotubes, the resin liquid is applied onto the surface or the surface is immersed in the resin liquid. When the light absorbing material is an inorganic black pigment or a black dye, the material may be mixed and kneaded with the resin liquid and applied onto the substrate.

Next, a mold having a surface on which a plurality of fine protrusions are formed is stamped onto a surface of the precursor before the resin liquid cures, and the resin liquid is cured to form the light absorbing layer 11 having the surface including the optical confinement structure (S110). The plurality of fine protrusions are formed on the surface of the mold, and by stamping the mold, the protrusions are transferred onto the surface of the precursor of the light absorbing layer to form the optical confinement structure. The resin liquid is preferably an ultraviolet curable resin, and the mold is preferably a material that transmits ultraviolet light. Thereby, the precursor of the light absorbing layer can be cured in a short time. The mold is formed, for example, as follows.

Figure 5:
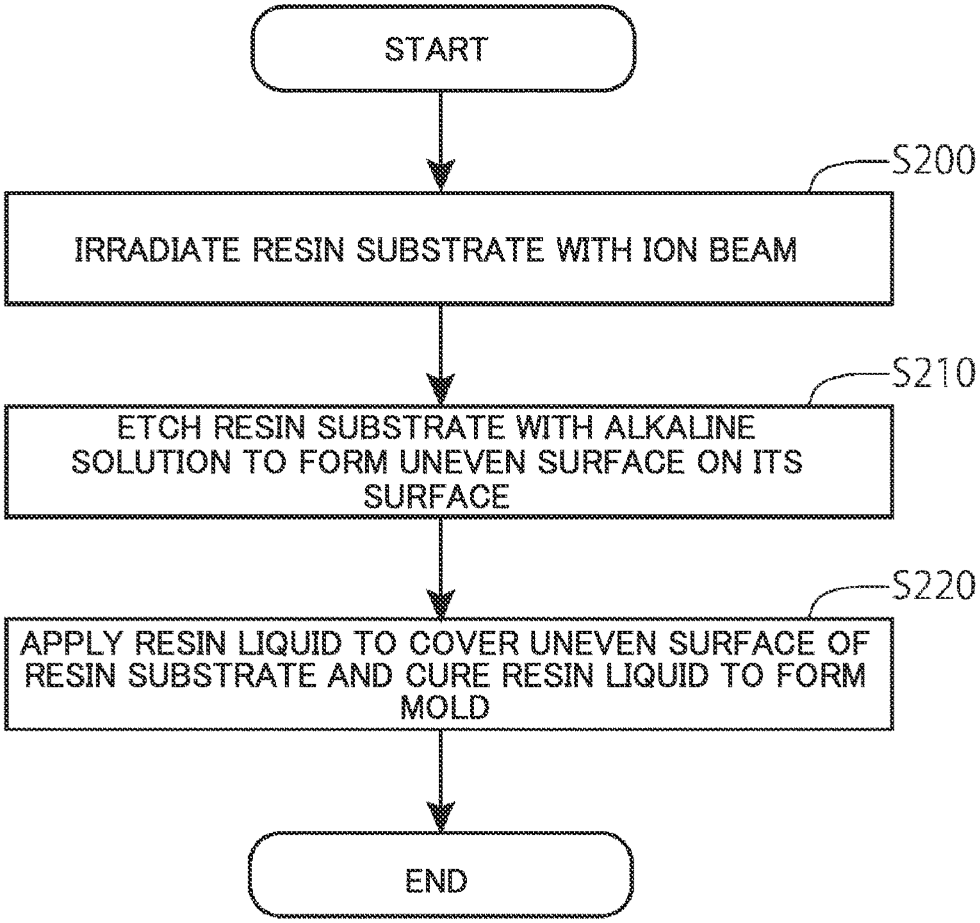
FIG. 5 is a flowchart showing a method for forming a mold.

FIG. 5 is a flowchart showing a method for forming the mold. Referring to FIG. 5, the method for forming the mold will be described.

Firstly, a resin substrate is irradiated with an ion beam (S200). Specifically, the resin substrate composed of, for example, allyldiglycol carbonate resin (CR-39) is irradiated with an ion beam accelerated by a cyclotron. As a result, a large number of ion tracks are formed in the vicinity of the surface of the resin substrate. It is preferable that the ion tracks are randomly distributed. Although the ion beam may include oxygen ions, it is preferable that the ion beam include either neon (Ne) ions or ions heavier than neon (Ne) ions because etching can easily proceed selectively along the ion tracks in the resin substrate and the final pit aspect ratio (fraction of pit depth to pit radius) can be increased.

It is preferable that the acceleration energy of the ion beam is 200 MeV or more because a satisfactory penetration depth can be obtained and a large pit aspect ratio can be obtained even if the pit radius is large. Although the irradiation density of the ion beam to the resin substrate is selected as appropriate, it is preferable to be $1\times10^5/cm^2$ to $1\times10^6/cm^2$ from the viewpoint of the density of pits sufficient to capture light at far-infrared wavelengths.

Then, the resin substrate irradiated with the ion beam is etched with an alkaline solution to form an uneven surface on its surface (S210). Specifically, as the alkaline solution, an aqueous solution of sodium hydroxide or potassium hydroxide is used to immerse the resin substrate irradiated with the ion beam for a predetermined period of time while being heated to, for example, 70° C. The resin substrate is then rinsed with water and dried.

Next, a resin liquid is applied so as to cover the uneven surface of the etched resin substrate and cured to form a mold (S220). This forms the mold. On the surface of the mold, an uneven surface having an inverted shape of the uneven surface formed by S210 is formed. The mold is formed by using, for example, a gas permeable elastomer material, a metal film, or a photocurable resin. For the mold, it is preferable to use the gas permeable elastomer material, for example, PDMS that easily de-gasses bubbles present between a coating of a resin liquid and the mold in a step of forming a light absorbing layer (S110 in FIG. 4).

The uneven surface of the mold specifically has a plurality of protrusions formed to protrude outward from the surface. Protrusion tips are connected like ridges or have the conical shape. Each protrusion has a cross-sectional shape gradually expanding from the tip toward the base. When the tips have a connected ridge-like shape, the distance between the adjacent ridges is preferably from 0.1 μm to 100 μm. When the tip is conical, the distance between the adjacent tips is preferably from 0.1 μm to 100 μm.

When the optical confinement structure 12 is formed using the mold formed in S220, the uneven surface in which the tips of the protrusions are connected like the ridges is formed, as shown in the electron micrograph of FIG. 2 described above.

Figure 6:
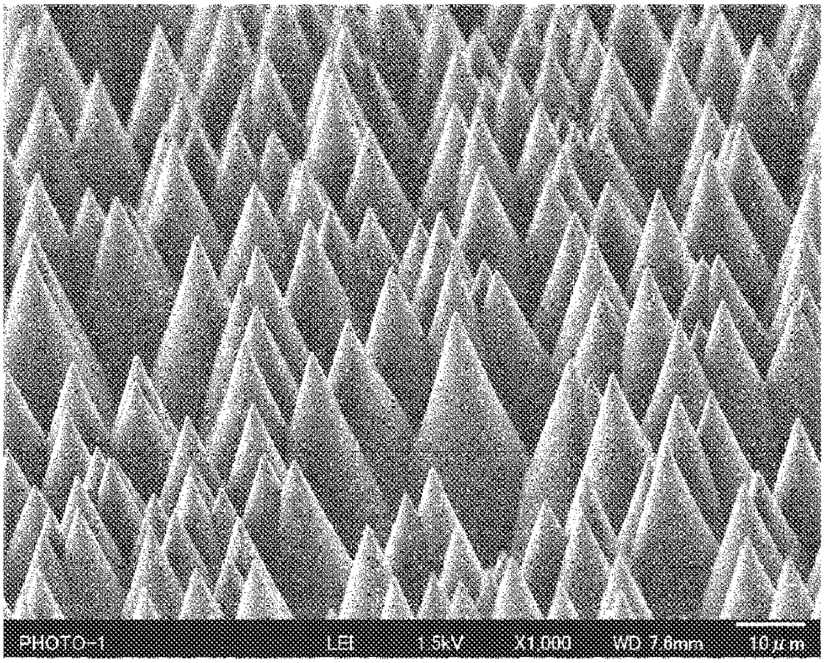
FIG. 6 is an electron micrograph of a surface of another example of the light absorber.

For the mold, a resin plate on which unevenness is transferred by applying a resin liquid onto the uneven surface of the mold formed in S220 may be used as the mold. Alternatively, a resin substrate having the uneven surface formed in S210 may be used as the mold. When the optical confinement structure 12 is formed using such a mold, an uneven surface is formed in which protrusion tips have a conical shape. FIG. 6 shows an example of such an optical confinement structure 12.

FIG. 6 is an electron micrograph of a surface of another example of the light absorber, showing another example of the optical confinement structure. Referring to FIG. 6, it is seen that the optical confinement structure has a plurality of protrusions, each protrusion tip being conical, and a cross-sectional shape gradually expanding from a tip toward a base, and adjacent conical tips are formed apart by 1 μm to several tens of micrometers.

According to the present embodiment, the light absorber 10 includes the optical confinement structure 12 on the surface of the light absorbing layer 11 having extremely low scattering properties. The light absorber 10 suppresses outward reflection of light incident on the optical confinement structure 12 from outside, makes the light propagate into the light absorbing layer 11, extremely suppresses outward scattering of light by the light absorbing material contained in the light absorbing layer 11 and has an extremely low reflectance. Along with this, the light absorber 10 can improve a contact resistance by forming the surface with the resin and can be used as an extremely low light reflective material on general use conditions.

Second Embodiment

Figure 7:
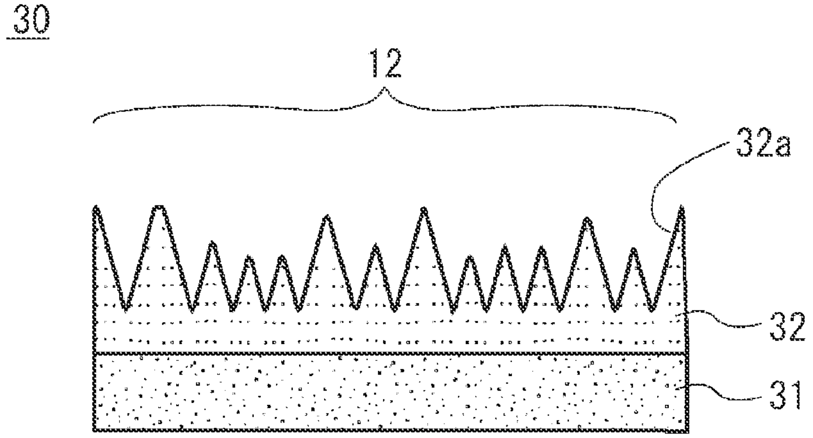
FIG. 7 is a schematic diagram showing a structure of a light absorber according to a second embodiment.

FIG. 7 is a schematic diagram showing a structure of a light absorber according to a second embodiment. Referring to FIG. 7, a light absorber 30 according to the second embodiment has a light absorbing layer 31 and a surface layer 32 thereon, and an optical confinement structure 12 is formed on a surface 32*a* of the surface layer 32. The optical confinement structure 12 is the same as in the first embodiment.

The light absorbing layer 31 is a layer containing a light absorbing material and a resin in the same manner as in the light absorbing layer 11 of the first embodiment, and a black lacquer coating film, an aligned carbon nanotube embedded resin layer and a black dye-containing resin layer can be used. The light absorbing layer 31 may contain a light absorbing material selected from the group consisting of a porous inorganic black film, an electrostatic flocking black cloth and a foamed polyurethane black sheet. The layer may be formed by combining these light absorbing materials.

The porous inorganic black film is made of a porous metal or metal oxide or their composite, for example, Metal Velvet from Acktar Ltd. The light absorber 30 has the porous inorganic black film as the light absorbing layer 31, and the surface layer 32 in which the light absorbing layer is embedded with a resin and the optical confinement structure 12 is formed on its surface.

The electrostatic flocking black cloth is a sheet-like material with a black brushed surface (for example, manufactured by Vel Suede Co., Ltd.; product name: RON-SUEDE-S0.5). In the light absorber 30, the surface layer 32 made of the rein is formed on the surface of the electrostatic flocking black cloth, to prevent deterioration of optical confinement properties due to dust and dirt and further to achieve extremely low light reflectivity by the optical confinement structure 12.

The foamed polyurethane black sheet is a porous sheet made of a polyurethane resin containing carbon black powder. In the light absorber 30, the surface layer 32 including the optical confinement structure 12 made of the resin is formed on the surface of the foamed polyurethane black sheet, to improve optical confinement properties and to thereby achieve the extremely low light reflectivity.

The surface layer 32 is made of at least one resin selected from the group consisting of ultraviolet curable resin, epoxy resin, polyester resin, acrylic resin, polycarbonate resin and vinyl chloride resin. Since the surface layer 32 is formed of such a resin, the optical confinement structure 12 formed on the surface can improve a contact resistance, and the optical confinement structure 12 is hard to deteriorate even if touched by hands, to suppress increase in light reflectance.

The surface layer 32 has translucency and may be transparent. The surface layer 32 transmits light propagating from the optical confinement structure 12 formed on the surface 32*a*, to propagate the light to the light absorbing layer 31. That is, light scattering in the surface layer 32 is suppressed to suppress outward propagating light.

The surface layer 32 may contain a black dye. The black dye has excellent light absorbing properties and low scattering properties, so that the reflectance can be reduced.

As described above, the light absorbing layer 31 of the light absorber 30 contains a light absorbing material having low light scattering properties. The low light scattering properties of the light absorbing layer 31 of the light absorber 30 can be characterized by mirror finishing the optical confinement structure 12 of the surface layer 32. As in the first embodiment, the light absorbing layer 31 is preferably configured such that luminous reflectance $R_{SCE}$ of the mirror finished light absorber 30 does not exceed 0.20%. In the light absorber 30, when the surface of the surface layer 32 is treated by the mirror fishing, a ratio $R_{SCE}/R_{SCI}$ of luminous reflectance $R_{SCE}$ according to SCE method to luminous reflectance $R_{SCI}$ according to SCI method does not exceed 0.05. An example of a mirror finishing method may include filling the surface layer 32 on which the optical confinement structure 12 is formed with a transparent resin liquid to form a microscopically flat surface or flattening the optical confinement structure 12 by processing such as polishing or dissolving. Another example of the mirror finishing method may include flatly forming the surface layer 32 without forming any optical confinement structure.

Figure 8:
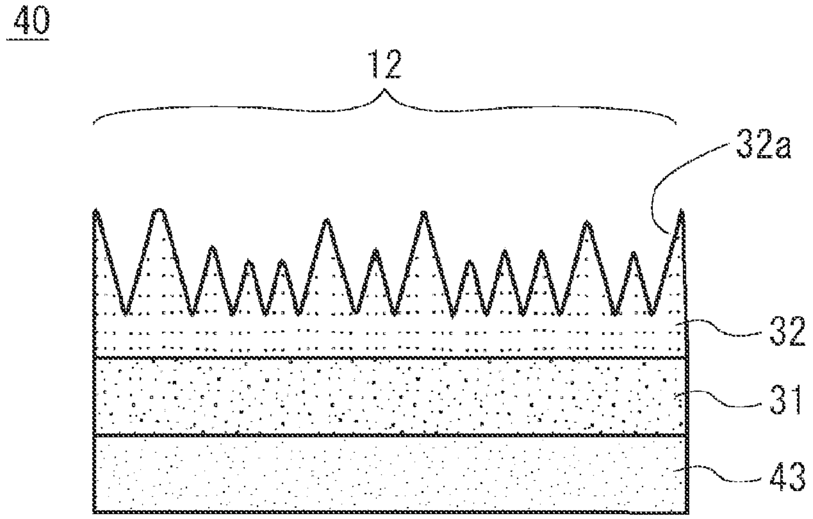
FIG. 8 is a schematic diagram showing a structure of a modification of the light absorber according to the second embodiment.

FIG. 8 is a schematic diagram showing a structure of a modification of the light absorber according to the second embodiment. Referring to FIG. 8, as the modification, a light absorber 40 includes an additional light absorbing underlayer 43 containing a light absorbing material under the light absorbing layer 31. The light absorbing material of the light absorbing underlayer 43 is not particularly limited, and it is preferable to use a light absorbing material different from that used in the light absorbing layer 31 among light absorbing materials for a light absorbing layer 31. When the light absorbing material of the light absorbing layer 31 is black lacquer, aligned carbon nanotubes or a black dye, the light absorbing material of the light absorbing underlayer 43 is preferably a porous inorganic black film or a resin layer containing carbon black. The resin of the light absorbing underlayer 43 is not particularly limited, and the same resin as in the light absorbing layer 31 can be used. The light absorber 40 has the light absorbing underlayer 43, the light absorbing layer 31 on the light absorbing underlayer, and a surface layer 32 on the light absorbing layer, and an optical confinement structure 12 is formed on a surface 32*a* of the surface layer 32. With this structure, even if there is light in a wavelength band transmitted through the light absorbing layer 31, the light is absorbed by the light absorbing material contained in the light absorbing underlayer 43, and the reflectance of the light absorber 40 is reduced. The light absorbing underlayer 43 may be formed of the same material as in the light absorbing underlayer 23 of the first embodiment. A plurality of light absorbing underlayers 43 may be provided. The light absorbing underlayer 43 may be laminated by combining layers having characteristics of absorbing different wavelengths.

Figure 9:
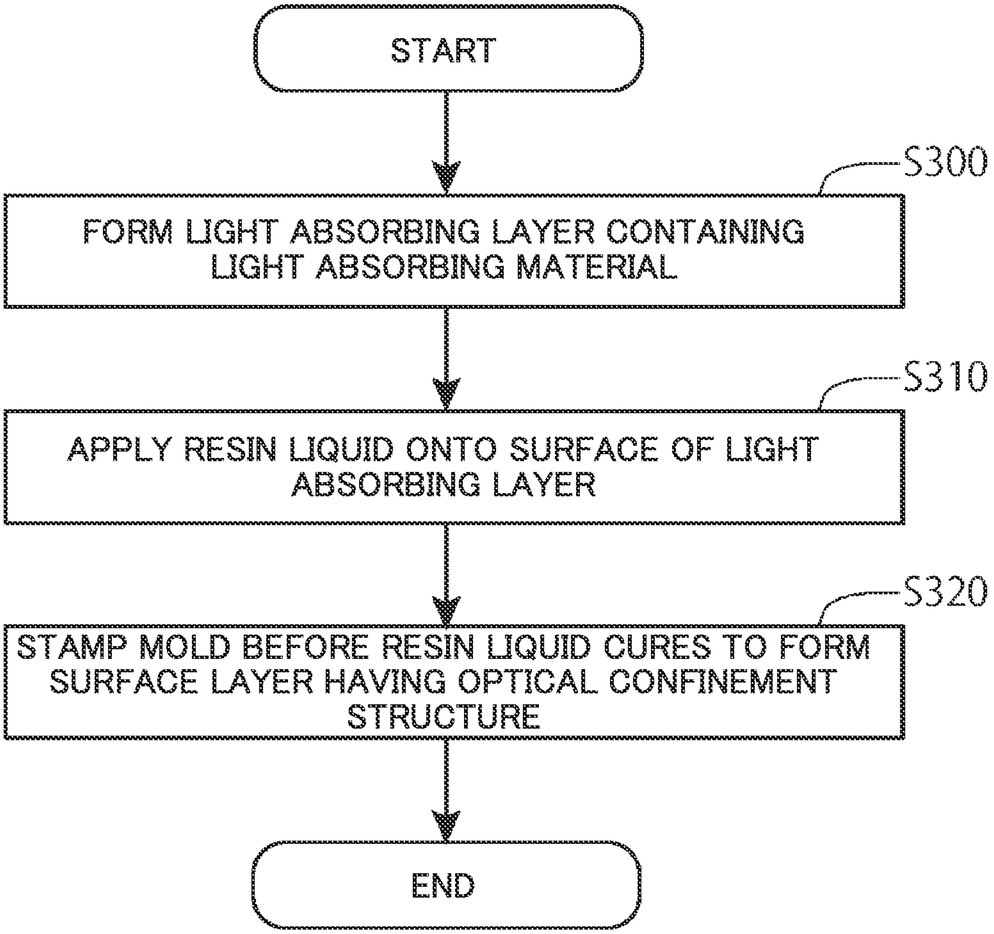
FIG. 9 is a flowchart showing a method for manufacturing the light absorber according to the second embodiment.

FIG. 9 is a flowchart showing a method for manufacturing the light absorber according to the second embodiment. Referring to FIG. 9, the method for manufacturing the light absorber of the present embodiment will be described.

Firstly, a light absorbing layer containing a light absorbing material is formed (S300). A resin layer containing the same light absorbing material as in the light absorbing layer 11 of the first embodiment is obtained by forming a precursor of the light absorbing layer in the same manner as in S100, and then curing a resin liquid to form the light absorbing layer 31. Alternatively, the above-described porous inorganic black film, electrostatic flocking black cloth or foamed polyurethane black sheet itself is used as the light absorbing layer 31.

Next, the resin liquid is applied onto the surface of the light absorbing layer, to form a precursor of the surface layer (S310). Specifically, a resin liquid containing a resin and a solvent depending on the resin material is applied onto the surface of the light absorbing layer 31. The resin may be the resin used in S100 or may be an ultraviolet curable resin. The resin may be transparent or may contain a black dye. The ultraviolet curable resin is preferable because the resin can be cured in a short time by ultraviolet irradiation.

Next, a mold in which a plurality of fine protrusions are formed on the surface is stamped onto the resin liquid before curing, and the resin liquid is cured to form a surface layer having a surface including an optical confinement structure (S320). The mold is similar to the mold in the first embodiment. The plurality of fine protrusions are formed in the mold and transferred to the surface of the precursor of the surface layer by stamping the mold to form the surface layer 32 including the optical confinement structure 12. When the resin liquid is an ultraviolet curable resin, the mold is preferably a material that transmits ultraviolet light. This can cure the precursor of the surface layer 32 in a short time.

According to the present embodiment, the light absorber 30 has the surface layer 32 in which the optical confinement structure 12 is formed on the surface of the light absorbing layer 31 having low scattering properties. According to the study of the present inventor, it has been found that, by forming the surface layer 32 on the light absorbing layer 31, the light scattering properties may be extremely reduced than those of the light absorbing layer 31 alone. In the light absorber 30, the surface layer 32 suppresses the outward reflection of light incident on the optical confinement structure 12 from outside, makes the light propagate into the light absorbing layer 31, and the light absorbing material contained in the light absorbing layer 31 extremely suppresses outward scattering, so that the luminous reflectance is extremely low. Along with this, the surface layer 32 formed with the resin can improve a contact resistance and can be used as an extremely low light reflective material on general use conditions.

Example 1

A light absorber of Example 1 is an example of the light absorber of the first embodiment. A light absorbing layer 11 is a black lacquer coating film. Black lacquer paint (synthetic lacquer paint) liquid (manufactured by SANKO CO., LTD.; product name: Urashima mark high-grade Urushi, black) was applied onto a flat polydimethylsiloxane (PDMS) sheet and formed with a thickness of 0.3 mm. A mold of polydimethylsiloxane (PDMS) formed as described with reference to FIG. 5 was used to be stamped onto the black lacquer paint liquid before curing, and the black lacquer paint liquid was cured, to form the light absorber having an optical confinement structure 12. A sample for mirror finish was prepared by coating and filling the optical confinement structure 12 with a transparent acrylic resin-based ultraviolet curable resin liquid (manufactured by PADICO Co., Ltd.; product name: UV-LED Resin, Star Drop Hard), irradiating the structure with ultraviolet rays (ultraviolet lamp (manufactured by ERUBERU CO., LTD.; product name: LED&UV LAMP), 6 W, irradiation time: three minutes), and curing the resin liquid to form a flat surface.

Example 2

A light absorber of Example 2 is an example of the light absorber of the modification of the first embodiment. As a light absorbing underlayer 23, a porous inorganic black film (manufactured by Acktar Ltd.; product name: Metal Velvet) was used. Thereon, as a light absorbing layer 11, a black lacquer paint (synthetic lacquer paint) liquid (manufactured by TOHO, Inc.; product name: special URUSHI, black) was applied and formed in a thickness of 0.3 mm. A mold of polydimethylsiloxane (PDMS) formed as described with reference to FIG. 5 was used to be stamped onto the black lacquer paint liquid before curing, and the black lacquer paint liquid was cured, to form the light absorber having an optical confinement structure. As a sample for mirror finish, a sample in which any optical confinement structure was not formed on the surface of the light absorbing layer 11 was used.

Example 3

A light absorber of Example 3 is an example of the light absorber of the modification of the first embodiment. In a light absorbing underlayer 23, as a resin layer containing carbon black, a color of acryl gouache (Turner Color Works, Ltd.; product name: Acryl gouache original color lamp black (PBk7)) was applied onto a polyethylene terephthalate (PET) sheet and dried. Thereon, the same black lacquer paint liquid as in Example 2 was applied, to form a light absorbing layer 11, and an optical confinement structure was formed. As a sample for mirror finish, a sample in which any optical confinement structure was not formed on the surface of the light absorbing layer 11 was used.

Example 4

A light absorber of Example 4 is an example of the light absorber of the second embodiment. For a light absorbing layer 31, as a light absorbing material, the same black lacquer paint liquid as in Example 1 was applied and cured with a thickness of 0.3 mm. Thereon, as a surface layer 32, a transparent acrylic resin-based ultraviolet curable resin liquid (manufactured by PADICO Co., Ltd.; product name: UV-LED Resin, Star Drop Soft) was applied onto the surface of the light absorbing layer 31 to form the surface layer with a thickness of 0.3 mm, and the same mold as in Example 1 was used to be stamped and irradiated with ultraviolet rays from the back surface of the mold (ultraviolet lamp (manufactured by ERUBERU CO., LTD.; product name: LED&UV LAMP), 6 W, irradiation time: three minutes), to form the light absorber having an optical confinement structure. As a sample for mirror finish, a sample in which any optical confinement structure was not formed on the surface of the surface layer 32 was used.

Comparative Example 1

A light absorber of Comparative Example 1 only includes the light absorbing layer 31 of Example 4, and a surface layer 32 was not formed.

Example 5

A light absorber of Example 5 is an example of the light absorber of the modification of the second embodiment. In a light absorbing underlayer 43, as a resin layer containing carbon black, a color of acryl gouache, lamp black color (Turner Color Works, Ltd.; product name: Acryl gouache original color lamp black (PBk7)) was applied onto a PET sheet and dried. Thereon, the same black lacquer paint as in Example 2 was applied to form a light absorbing layer 31 with a thickness of 0.3 mm. After a black lacquer paint liquid cured, a surface layer 32 was formed in the same manner as in Example 4. As a sample for mirror finish, a sample in which any optical confinement structure was not formed on the surface of the surface layer 32 was used.

Example 6

A light absorber of Example 6 is an example of the light absorber of the second embodiment. A light absorbing layer 31 was formed by dropping the same ultraviolet curable resin liquid as in Example 4 to aligned carbon nanotubes (manufactured by MICROPHASE Co., Ltd.; product name: VACNT-SS, carbon nanotubes perpendicularly grown on an Ni substrate and having a length of 5 μm) as a light absorbing material, irradiating the material with ultraviolet rays (ultraviolet lamp (manufactured by ERUBERU CO., LTD.; product name: LED&UV LAMP), 6 W, irradiation time: three minutes) after vacuum degassing, and curing the material. Thus, the light absorbing layer 31 was peeled off from the Ni substrate and obtained. Thereon, as a surface layer 32, a transparent acrylate resin-based ultraviolet curable resin liquid (manufactured by KIYOHARA & Co., Ltd.; product name: LED&UV Craft Resin) was applied to form the surface layer with a thickness of 0.3 mm, and the same mold as in Example 1 was used, pressed and irradiated with ultraviolet rays from the back surface of the mold, to form the light absorber having an optical confinement structure. As a sample for mirror finish, the light absorbing layer 31 was used alone.

Comparative Example 2

A light absorber of Comparative Example 2 includes aligned carbon nanotubes of Example 6 alone.

Example 7

A light absorber of Example 7 is an example of the light absorber of the second embodiment. As a light absorbing layer 31, a porous inorganic black film (manufactured by Acktar Ltd.; product name: Metal Velvet) was used. Thereon, a surface layer 32 was formed in the same manner as in Example 4. As a sample for mirror finish, a sample in which any optical confinement structure was not formed on the surface of the surface layer 32 was used.

Comparative Example 3

A light absorber of Comparative Example 3 includes a porous inorganic black film of Example 7 alone.

Example 8

A light absorber of Example 8 is an example of the light absorber of the second embodiment. In a light absorbing layer 31, as a resin layer containing a black dye, a color of acryl gouache jet black color (Turner Color Works, Ltd.; product name: Acryl gouache original color jet black (PBk1)) was applied onto a PET sheet and dried. Thereon, a surface layer 32 was formed in the same manner as in Example 4. As a sample for mirror finish, a sample in which any optical confinement structure was not formed on the surface of the surface layer 32 was used.

Comparative Example 4

A light absorber of Comparative Example 4 includes the light absorbing layer 31 of Example 8, and the surface layer 32 was not formed thereon.

Example 9

A light absorber of Example 9 is an example of the light absorber of the second embodiment. In a light absorbing layer 31, as a resin layer containing a black dye and carbon black, a color of acryl gouache jet black color (Turner Color Works, Ltd.; product name: Acryl gouache original color jet black (PBk1)) and a color of acryl gouache lamp black color (Turner Color Works, Ltd.; product name: Acryl gouache original color lamp black (PBk7)) were mixed at a weight ratio of 5:1, applied onto a PET sheet and dried. Thereon, a surface layer 32 was formed in the same manner as in Example 4. As a sample for mirror finish, a sample in which any optical confinement structure was not formed on the surface of the surface layer 32 was used.

Example 10

A light absorber of Example 10 is an example of the light absorber of the second embodiment. In a light absorbing layer 31, the same material as in Example 9 was used, and acrylic gouache jet black color and lamp black color were mixed at a weight ratio of 2.5:1, applied onto a PET sheet and dried. Thereon, a surface layer 32 was formed in the same manner as in Example 4. As a sample for mirror finish, a sample in which any optical confinement structure was not formed on the surface of the surface layer 32 was used.

Comparative Example 5

In a light absorber of Comparative Example 5, as a light absorbing layer, the lamp black color used in Examples 9 and 10 was applied onto a PET sheet with a thickness of 0.2 mm, and a surface layer 32 was not formed thereon.

Example 11

A light absorber of Example 11 is an example of the light absorber of the modification of the first embodiment. In a light absorbing underlayer 23, as a resin layer containing carbon black, a color of acryl gouache (Turner Color Works, Ltd.; product name: Acryl gouache original color lamp black (PBk7)) was applied onto a PET sheet and dried. Thereon, as a light absorbing layer 11 containing a black dye, a two-component epoxy resin (manufactured by NISSHIN RESIN, Co., Ltd.; product name: Crystal Resin) was mixed and kneaded with 2 wt % of black dye (manufactured by HOLBEIN; product name: expert pigment #30 PG143 Diamond Black (condensed aniline), applied and the same mold as in Example 1 was used to be stamped during curing. As a sample for mirror finish, a sample in which any optical confinement structure was not formed on the surface of the light absorbing layer 11 was used.

Example 12

A light absorber of Example 12 is an example of the light absorber of the second embodiment. In a light absorbing layer 31, an electrostatic flocking black cloth (manufactured by Vel Suede Co., Ltd.; product name: electrostatic flocking sheet RON-SUEDE-S, thickness of 0.50 mm) was used. Thereon, a surface layer 32 was formed in the same manner as in Example 4. As a sample for mirror finish, a sample in which any optical confinement structure was not formed on the surface of the surface layer 32 was used.

Comparative Example 6

A light absorber of Comparative Example 6 includes the electrostatic flocking black cloth of Example 12 alone, and a surface layer 32 was not formed thereon.

Example 13

A light absorber of Example 13 is an example of the light absorber of the second embodiment. In a light absorbing layer 31, a foamed polyurethane black sheet containing carbon black (manufactured by Systems Engineering Inc.; product name: light shielding/absorbing sheet Super Black IR) was used. Thereon, a surface layer 32 was formed in the same manner as in Example 4. As a sample for mirror finish, a sample in which any optical confinement structure was not formed on the surface of the surface layer 32 was used.

Comparative Example 7

A light absorber of Comparative Example 7 includes the foamed polyurethane black sheet of Example 13 alone, and a surface layer 32 was not formed thereon.

Comparative Example 8

In a light absorber of Comparative Example 8, an optical confinement structure was formed on the surface, and a light absorbing layer was formed of a silicone rubber containing carbon black as a light absorbing material. An electrode layer for electroplating including a Ti film with a thickness of 50 nm and a Cu film with a thickness of 300 nm was formed by a sputtering method on CR-39 on which an uneven surface was formed in S210 of FIG. 5. Then, an Ni plating film with a thickness of 500 μm was formed as a transfer body on the electrode layer by an electroplating method. Subsequently, the Ni plating film was peeled off from the resin substrate to obtain a Ni plating film to which unevenness was transferred. Next, a main agent and a curing agent of a two-component curable silicone composition (manufactured by Shin-Etsu Silicone Co., Ltd.; SIM-360 main agent and CAT-360 curing agent) were mixed at a ratio of 9:1, and further, 5 wt % carbon black was mixed and kneaded with the silicone composition. After degassing, the mixture was dropped and applied onto the uneven surface of the Ni plating film to cover the surface. After further degassing in a vacuum desiccator, it was allowed to stand at room temperature for 12 hours to obtain a cured silicone rubber. Subsequently, the cured silicone rubber was peeled off from the Ni plating film to obtain the light absorber of a carbon black-containing silicone rubber of Comparative Example 8 to which the unevenness was transferred.

FIG. 10 is a diagram showing the luminous reflectance $R_{SCI}$ of the example, and also describes luminous reflectance $R_{SCE}$, luminous reflectance $R_{SCI}$ and ratio $R_{SCE}/R_{SCI}$ of each mirror finished sample. FIG. 11 is a diagram showing luminous reflectance $R_{SCI}$ of each comparative example.

Referring to FIGS. 10 and 11, it can be seen that Examples 1 to 13 are the light absorbers having luminous reflectance $R_{SCI}$ according to an SCI method in a range of 0.02% to 0.17% and having an extremely low luminous reflectance $R_{SCI}$ that does not exceed 0.20%. It can be seen that Comparative Examples 3, 4, 6 and 7, each of which is a conventional commercially available light absorber alone, have the luminous reflectance $R_{SCI}$ according to the SCI method in a range of 0.56% to 1.36%, and Examples 1 to 13 are light absorbers having luminous reflectance $R_{SCI}$ that is extremely lower than those of the comparative examples. Further, it can be seen that Examples 1 to 13 have the luminous reflectance $R_{SCI}$ that is lower than that of Comparative Example 8.

In particular, in Examples 1 to 8 and 11, it can be seen that the luminous reflectance $R_{SCI}$ according to the SCI method does not exceed 0.10%. The light absorbing materials of the light absorbing layers 11 and 31 in Examples 1 to 8 and 11 is black synthetic lacquer, aligned carbon nanotubes, an inorganic black pigment and a black dye. These light absorbing materials are preferable because the luminous reflectance can be reduced to be extremely low and not to exceed 0.10%.

In the mirror finished samples of Examples 1 to 13, that is, the light absorbers in which any optical confinement structure is not present, the luminous reflectance $R_{SCE}$ according to the SCE method, which detects diffuse reflected light, is from 0.00% to 0.17%. From this, it can be seen that Examples 1 to 13 exhibit an extremely low luminous reflectance $R_{SCI}$ according to the SCI method by combining the light absorbing layer having extremely low light scattering properties and the optical confinement structure.

In Example 4, the luminous reflectance $R_{SCI}$ is 0.07%, while in Comparative Example 1, the luminous reflectance $R_{SCI}$ is 4.90%, and it can be seen that the surface layer 32 including the optical confinement structure of Example 4 provides improved low reflectivity.

In Example 6, the luminous reflectance $R_{SCI}$ is 0.07%, while in Comparative Example 2, the luminous reflectance $R_{SCI}$ is almost equal and 0.06%. Aligned carbon nanotubes are arranged at the surface of Comparative Example 2, while in Example 6, the surface layer 32 is formed of a resin, and hence Example 6 has a higher contact resistance than Comparative Example 2.

In Example 7, the luminous reflectance $R_{SCI}$ is 0.06%, while in Comparative Example 3, the luminous reflectance $R_{SCI}$ is 0.86%, and it can be seen that the surface layer 32 including the optical confinement structure of Example 7 provides the improved low reflectivity. Also, Example 7 has a higher contact resistance than Comparative Example 3 due to the surface layer 32.

In Example 8, the luminous reflectance $R_{SCI}$ is 0.08%, while in Comparative Example 4, the luminous reflectance $R_{SCI}$ is 1.36%, and it can be seen that the surface layer 32 including the optical confinement structure of Example 8 provides the improved low reflectivity. Also, Example 8 has a higher contact resistance than Comparative Example 4 due to the surface layer 32.

Examples 9 and 10 have luminous reflectance $R_{SCI}$ of 0.12% and 0.17%, while in Comparative Example 5, the luminous reflectance $R_{SCI}$ is 2.47%, and it can be seen that the surface layer 32 including the optical confinement structure in Examples 9 and 10 provides the improved low reflectivity. Also, Examples 9 and 10 have a higher contact resistance than Comparative Example 5 due to the surface layer 32.

In Example 12, the luminous reflectance $R_{SCI}$ is 0.11%, while in Comparative Example 6, the luminous reflectance $R_{SCI}$ is 0.56%, and it can be seen that the surface layer 32 including the optical confinement structure of Example 12 provides the improved low reflectivity.

In Example 13, the luminous reflectance $R_{SCI}$ is 0.17%, while in Comparative Example 7, the luminous reflectance $R_{SCI}$ is 1.22%, and it can be seen that the surface layer 32 including the optical confinement structure of Example 13 provides the improved low reflectivity.

FIG. 12 is a diagram showing the reflectance $R_{SCI}$ according to the SCI method in near infrared in the examples, showing a maximum reflectance at wavelengths of 1000 nm to 2000 nm. Referring to FIG. 12, it can be seen that Examples 2, 3, 5 to 7, 12 and 13 have an extremely low reflectance $R_{SCI}$ according to the SCI method even in near infrared. For example, in Example 2, since the maximum reflectance $R_{SCI}$ is 0.14%, the reflectance $R_{SCI}$ does not exceed 0.14% over wavelengths of 1000 nm to 2000 nm. From this, it can be seen that the light absorbers of these examples indicate excellently extremely low reflectivity in a wavelength range from visible to near infrared.

In a method of measuring the reflectance $R_{SCI}$ according to the SCI method in near infrared, the reflectance $R_{SCI}$ was measured at intervals of 10 nm in a measurement wavelength range of 1000 nm to 2000 nm by use of a hemispherical reflectance measuring unit (Spectralon integrating sphere) in an ultraviolet-visible near-infrared spectrophotometer (product name: LAMBDA 900) manufactured by PerkinElmer, Inc., on conditions of 8°/di (8° directional incidence and diffuse light detection, including a specular reflection component). A measured value was obtained by subtracting a baseline signal that occurred without any sample being placed in a sample port. As a reference standard, a Spectralon 99% reflectance standard with calibrated values (manufactured by Labsphere, Inc., USA; product number: SRS-99-020) was used. FIG. 12 shows the maximum reflectance $R_{SCI}$ in the measurement wavelength range.

While the embodiments and examples of the present invention have been described above in detail, the present invention is not limited to the specific embodiments and examples, and various modifications and changes can be made within the scope of the present invention recited in the Claims.

Further, the light absorber according to the embodiment of the present invention is useful for professional applications seeking an extreme level of non-reflective performance (spectroscopic analysis, space telescopes, and the like) and in real life. For example, it can be applied to prevent internal reflection in a barrel of a camera lens, prevent reflection of an automobile dashboard, increase contrast of a display, decorate with a luxurious black finish, and the like.

The invention claimed is:

1. A light absorber comprising:

a light absorbing layer made of a resin which contains a light absorbing material, and an optical confinement structure including a plurality of fine protrusions formed on a surface of the light absorber, wherein the light absorber is configured such that luminous reflectance $R_{SCE}$ according to a specular components excluded (SCE) method, which detects diffuse reflected light, does not exceed 0.20% when the surface on which the optical confinement structure is formed is mirror finished, and wherein the light absorber is configured such that luminous reflectance $R_{SCI}$ according to a specular components included (SCI) method, which detects a total of specular reflected light and diffuse reflected light, does not exceed 0.20%.

2. The light absorber according to claim 1, wherein the optical confinement structure has a plurality of protrusions which protrude outward from the surface, the protrusions have tips being connected like ridges or having a conical shape and have a cross-sectional shape gradually expanding from a tip toward a base, and a distance between adjacent ridges or adjacent conical tips is from 0.1 μm to 100 μm.

3. The light absorber according to claim 1, wherein the mirror finished surface is formed by filling, with a transparent resin, the surface on which the optical confinement structure is formed.

4. The light absorber according to claim 1, wherein the mirror finished surface is formed by flattening the surface on which the optical confinement structure is formed.

5. The light absorber according to claim 1, wherein the light absorbing material includes a material selected from the group consisting of black lacquer, an inorganic black pigment, aligned carbon nanotubes and a black dye.

6. The light absorber according to claim 5, further comprising:

a porous inorganic black film or a resin layer containing carbon black under the light absorbing layer, when the light absorbing material is black lacquer or a black dye.

7. The light absorber according to claim 5, further containing carbon black as the light absorbing material, when the light absorbing material is a black dye.

8. The light absorber according to claim 1, wherein the resin of the light absorbing layer comprises at least one resin selected from the group consisting of epoxy resin, polyester resin, acrylic resin, polycarbonate resin and vinyl chloride resin, or an ultraviolet curable resin, or the light absorbing layer has a surface on which the optical confinement structure is formed.

9. The light absorber according to claim 1, wherein the light absorber is configured such that the luminous reflectance $R_{SCI}$ according to the SCI method does not exceed 0.10%.

10. A method for manufacturing a light absorber according to claim 1 comprising: a step of forming a precursor of a light absorbing layer with a light absorbing material and a resin liquid, and a step of stamping, onto a surface of the precursor, a mold having a surface on which a plurality of fine protrusions are formed, before the resin liquid cures, and curing the resin liquid to form a light absorbing layer having a surface including an optical confinement structure, wherein the light absorbing material includes a material selected from the group consisting of black lacquer, an inorganic black pigment, aligned carbon nanotubes and a black dye, wherein the light absorber is configured such that luminous reflectance Rsci according to a specular components included (SCI) method, which detects a total of specular reflected light and diffuse reflected light, does not exceed 0.20%.

11. The manufacturing method according to claim 10, further comprising: a step of forming the mold, wherein the step of forming the mold includes a step of irradiating a resin substrate with an ion beam, a step of etching the irradiated resin substrate with an alkaline solution to form an uneven surface on a surface of the resin substrate, and (i) a step of applying a resin liquid onto the uneven surface of the etched resin substrate to form the mold, or (ii) a step of applying a resin liquid onto the uneven surface of the etched resin substrate to form a transfer body, and a step of applying a resin liquid onto an uneven surface of the transfer body to form the mold.

12. The manufacturing method according to claim 11, wherein the resin substrate is made of allyldiglycol carbonate resin (CR-39).

13. The manufacturing method according to claim 10, wherein the mold is made of a gas permeable elastomer material, or the mold has a plurality of protrusions which protrude outward from a surface, the protrusions have tips being connected like ridges or having a conical shape and have a cross-sectional shape gradually expanding from a tip toward a base, and a distance between adjacent ridges or adjacent conical tips is from 0.1 μm to 100 μm.

14. A light absorber comprising:

one other light absorbing layer containing a light absorbing material, and a surface layer provided on the other light absorbing layer, and made of a resin including an optical confinement structure including a plurality of fine protrusions formed on a surface thereof, wherein the light absorber is configured such that luminous reflectance $R_{SCE}$ according to a specular components excluded (SCE) method, which detects diffuse reflected light, does not exceed 0.20% when the surface on which the optical confinement structure is formed is mirror finished, and wherein the light absorber is configured such that luminous reflectance $R_{SCI}$ according to a specular components included (SCI) method, which detects a total of specular reflected light and diffuse reflected light, does not exceed 0.20%.

15. The light absorber according to claim 14, wherein the other light absorbing layer contains a resin and a light absorbing material selected from the group consisting of black lacquer, an inorganic black pigment, aligned carbon nanotubes and a black dye, or contains a light absorbing material selected from the group consisting of a porous inorganic black film, an electrostatic flocking black cloth and a foamed polyurethane black sheet.

16. The light absorber according to claim 15, further containing carbon black as the light absorbing material, when the light absorbing material contains a black dye.

17. The light absorber according to claim 15, further comprising a porous inorganic black film or a resin layer containing carbon black under the light absorbing layer, when the light absorbing material contains black lacquer, aligned carbon nanotubes or a black dye.

18. The light absorber according to claim 14, wherein the surface layer contains a black dye, or the surface layer is made of at least one resin selected from the group consisting of epoxy resin, polyester resin, acrylic resin, polycarbonate resin and vinyl chloride resin, or the surface layer is made of an ultraviolet curable resin.

19. A method for manufacturing a light absorber according to claim 14, comprising: a step of forming a light absorbing layer containing a resin and a light absorbing material selected from the group consisting of black lacquer, an inorganic black pigment, aligned carbon nanotubes and a black dye, or containing a light absorbing material selected from the group consisting of a porous inorganic black film, an electrostatic flocking black cloth and a foamed polyurethane black sheet, a step of applying a resin liquid onto a surface of the light absorbing layer, and a step of stamping a mold having a surface on which a plurality of fine protrusions are formed, before the resin liquid cures, and curing the resin liquid to form a surface layer having a surface including an optical confinement structure, wherein the light absorber is configured such that luminous reflectance Rsci according to a specular components included (SCI) method, which detects a total of specular reflected light and diffuse reflected light, does not exceed 0.20%.

* * * * *